United States Patent [19]
Valet et al.

[11] Patent Number: 5,420,204
[45] Date of Patent: * May 30, 1995

[54] LIGHT-STABILISED COPOLYMER COMPOSITIONS AS PAINT BINDERS

[75] Inventors: Andreas Valet, Eimeldingen, Germany; Roger Meuwly, Marly; Mario Slongo, Tafers, both of Switzerland

[73] Assignee: Ciba-Geigy Corporation, Ardsley, N.Y.

[ * ] Notice: The portion of the term of this patent subsequent to Mar. 30, 2010 has been disclaimed.

[21] Appl. No.: 212,671

[22] Filed: Mar. 11, 1994

Related U.S. Application Data

[63] Continuation of Ser. No. 916,932, Jul. 20, 1992, abandoned.

[30] Foreign Application Priority Data

Jul. 29, 1991 [CH] Switzerland ............... 2253/91

[51] Int. Cl.$^6$ ............... C08F 8/30; C08F 33/08; C08L 33/10
[52] U.S. Cl. ............... 525/125; 525/199; 525/220; 525/221; 525/222; 525/227; 525/479; 525/157
[58] Field of Search ............... 525/125, 199, 326.5, 525/220, 221, 222, 223, 227, 454, 479, 157

[56] References Cited

U.S. PATENT DOCUMENTS

| | | |
|---|---|---|
| 4,576,977 | 3/1986 | Miyazaki et al. . |
| 4,871,610 | 10/1989 | Takata et al. ............ 428/246 |
| 5,198,498 | 3/1993 | Valet et al. ............ 525/125 |

FOREIGN PATENT DOCUMENTS

| | | |
|---|---|---|
| 0441746 | 8/1991 | European Pat. Off. . |
| 2192399 | 1/1988 | United Kingdom . |

OTHER PUBLICATIONS

Progress in Organic Coatings, 16(1988) 113–134.

*Primary Examiner*—James J. Seidleck
*Assistant Examiner*—Mary Critharis
*Attorney, Agent, or Firm*—Luther A. R. Hall

[57] ABSTRACT

Curable compositions comprising (a) a fluorine- or silicon-containing copolymer, (b) a (meth)acrylic copolymer and (c) at least one curing agent are described, each of the two copolymers comprising functional groups which can react with the curing agent, wherein the fluorine- or silicon-containing copolymer comprises a UV absorber which is chemically bound by reaction with the free reactive groups of the copolymer. These copolymer compositions can be used as paint binders.

17 Claims, No Drawings

LIGHT-STABILISED COPOLYMER COMPOSITIONS AS PAINT BINDERS

This is a continuation of application Ser. No. 07/916,932, filed on Jul. 20, 1992, now abandoned.

The invention relates to a mixture of two copolymers and at least one curing agent, and to the use of this mixture as a paint binder. One copolymer comprises fluorine or silicon and a UV absorber which is bound via a reactive group to the copolymer. The other copolymer is an acrylic resin.

Recently, fluorine- or silicon-containing copolymers as binders for high-grade paint materials have been disclosed. These copolymers confer high weathering resistance, high gloss and dirt-repellence to the coatings. These materials are therefore of interest above all for exterior applications and, for these purposes, UV absorbers have also already been added to such paints, in order to enhance their resistance to UV light. These developments have been described, for example, in Progress in Organic Coatings 16 (1988), 113-134.

Since the added UV absorbers in the outer layers of a coating can volatilise in the course of time or can be eluted, it has already been proposed (U.S. Pat. No. 4,576,977) to bind a UV absorber of the benzophenone type to the binder by reaction with the crosslinking agent. In this case, benzophenone UV absorbers having reactive hydroxyl groups are used, which react with a melamine resin crosslinking agent, for example during curing.

Because of the high price of fluorine- or silicon-containing copolymers, these are advantageously used as a mixture with binders which are free of fluorine or silicon, for example with acrylate copolymers (GB-A-2 192 399).

It was the object of the invention to accomplish a further improvement in such systems.

It has now been found that, surprisingly, a particularly good light-stabilising action is obtained if a UV absorber is bound to the fluorine- or silicon-containing copolymer. The invention therefore relates to a curable composition comprising (a) a fluorine- or silicon-containing copolymer, (b) a (meth)acrylic copolymer and (c) at least one curing agent, each of the two copolymers comprising functional groups which can react with the curing agent, wherein the fluorine- or silicon-containing copolymer (a) comprises a UV absorber which is chemically bound by reaction with the free reactive groups of the finished copolymer.

It is important to stress here that component (a) is the product of the reaction of the fluorine or silicone containing copolymer with the reactive UV absorber (polymer-analogous reaction).

Advantageously, the copolymer (b) does not contain a UV absorber in the bound form.

The invention also relates to processes for producing a curable composition, which comprises reacting a fluorine- or silicon-containing copolymer comprising free functional groups, with a UV absorber comprising reactive groups which can react with the functional groups of the copolymer, and mixing the product with a (meth)acrylic copolymer, which likewise comprises functional groups, and a curing agent.

The invention also relates to a clear or pigmented coating which, as binder, comprises a composition as described above, and to the cured paint film which is obtained by curing such a coating. The coating can comprise a light stabiliser from the class of the sterically hindered amines, preferably a derivative of 2,2,6,6-tetramethylpiperidine.

According to the invention, reactive UV absorbers especially from the class of the 2-(2-hydroxyphenyl)-benzotriazoles, the 2-(2-hydroxyphenyl)-1,3,5-triazines, the oxanilides or the o-hydroxybenzophenones, in particular those from the class of the 2-(2-hydroxyphenyl)-benzotriazoles and 2-(2-hydroxyphenyl)-1,3,5-triazines, are used.

Preferably, the reactive UV absorber comprises a hydroxyl group, carboxyl group or epoxide group.

If the copolymer comprises carboxyl groups, the reactive UV absorber can, for example, comprise a hydroxyl group, but preferably the UV absorber comprises an epoxide group, especially a glycidyl group

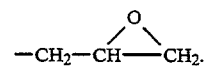

If the copolymer comprises hydroxyl groups, the reactive UV absorber can, for example, comprise carboxyl groups or epoxide groups. If the copolymer comprises epoxide groups, the reactive UV absorber can, for example, comprise carboxyl groups or hydroxyl groups.

The copolymer and the UV absorber can also comprise a plurality of different functional groups, for example hydroxyl groups and carboxyl groups or hydroxyl groups and epoxide groups.

Preferably, copolymer and UV absorber are bound to one another by reaction of epoxide groups with carboxyl groups or hydroxyl groups.

A composition is preferred in which the copolymers (a) and (b) comprise hydroxyl groups, and the curing agent is a compound which can react with hydroxyl groups.

The copolymer comprises either a fluoro-organic component or a silicon-organic component in a copolymerised form. The copolymer (a) can also contain a copolymerisable, sterically hindered amine, such as is described in EP-A-441 746.

A composition in which the component (a) is a fluorine-containing copolymer is of particular interest.

If it comprises a fluoroorganic component, it is preferably a copolymer of
(1) a polyfluoroolefin,
(2) at least one alkyl vinyl ether and/or cycloalkyl vinyl ether,
(3) a hydroxyalkyl vinyl ether,
(4) if appropriate, further copolymerisable compounds.

Examples of polyfluoroolefins are 1,1-difluoroethylene, tetrafluoroethylene or hexafluoropropylene, but especially chlorotrifluoroethylene. Preferably, the copolymer comprises at least 30% by weight of chlorotrifluoroethylene.

Examples of alkyl vinyl ethers are methyl vinyl ether, ethyl vinyl ether, propyl vinyl ether, isopropyl vinyl ether, butyl vinyl ether, hexyl vinyl ether or octyl vinyl ether.

An example of a cycloalkyl vinyl ether is cyclohexyl vinyl ether.

Examples of hydroxyalkyl vinyl ethers are 3-hydroxypropyl vinyl ether, 4-hydroxybutyl vinyl ether or 5-hydroxypentyl vinyl ether.

Examples of further copolymerisable compounds (component 4) are styrene, α-methylstyrene, acrylic and methacrylic acid and alkyl esters thereof, acrylonitrile, maleic acid monoalkyl or dialkyl esters or maleimides.

The copolymer can also contain a copolymerisable, sterically hindered amine as a further copolymerisable compound. Examples of sterically hindered amines suitable for this purpose are 2,2,6,6-tetramethyl-4-piperidyl acrylate or methacrylate and 1,2,2,6,6-pentamethyl-4-piperidyl acrylate or methacrylate.

Component (1) is preferably chlorotrifluoroethylene, and the content thereof in the copolymer is preferably at least 30% by weight.

The fluorine-containing copolymer a) preferably consists of 30–60% by weight of component (1), 20–50% by weight of component (2), 5–20% by weight of component (3) and 0–15% by weight of component (4).

Examples of fluorine-containing copolymers having reactive groups are copolymers of chlorotrifluoroethylene and hydroxyalkyl acrylates, hydroxyalkyl vinyl ethers, N-hydroxyalkylacrylamides, acrylic acid, methacrylic acid, maleic acid, maleic acid half-esters, crotonic acid, glycidyl acrylate or glycidyl methacrylate.

An example of the preparation of a fluorine-containing copolymer according to the invention is schematically represented below: By reacting a vinyl ether with a hydroxy vinyl ether and chlorotrifluoroethylene, a fluorine-containing copolymer is obtained:

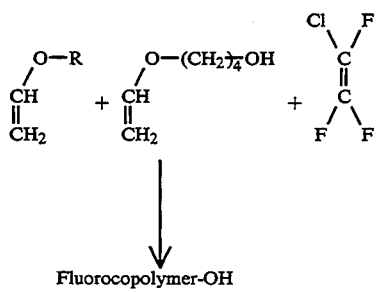

Fluorocopolymer-OH

R is an organic radical.

This "prepolymer" can, for example, be reacted with succinic anhydride to give a fluoro copolymer modified by a reactive carboxyl end group:

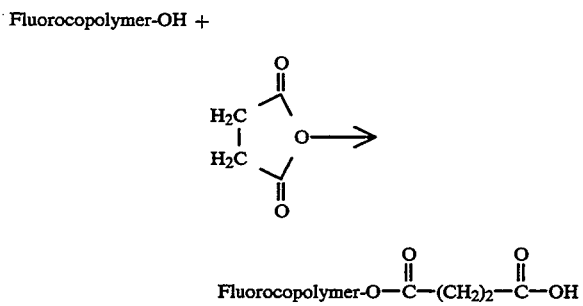

Fluorocopolymer-O—C(=O)—(CH$_2$)$_2$—C(=O)—OH

This carboxyl end group is then capable of binding a UV absorber modified by a reactive epoxide group:

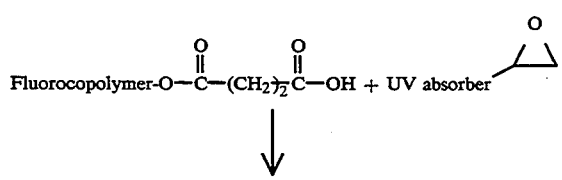

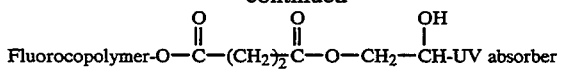

Fluorocopolymer-O—C(=O)—(CH$_2$)$_2$C(=O)—O—CH$_2$—CH(OH)-UV absorber

A composition wherein component (a) is a silicon-containing copolymer is also of particular interest.

If the copolymer comprises a silicon-organic component, it is preferably a copolymer of
(1) an ethylenically unsaturated organosilicon compound,
(2) at least one alkyl acrylate or methacrylate,
(3) a hydroxyalkyl(meth)acrylate and/or epoxyalkyl(meth)acrylate and
(4) if appropriate, further copolymerisable compounds.

Examples of ethylenically unsaturated organosilicon compounds are vinylsilicon compounds, allylsilicon compounds or silicon-containing (meth)acrylates.

Examples of silicon-containing copolymers with reactive groups are copolymers of unsaturated organosilicon compounds and acrylates or methacrylates, acrylic or methacrylic acid, hydroxyalkyl(meth)acrylates, N-hydroxyalkyl(meth)acrylamides or glycidyl(meth)acrylate.

Examples of silicon-containing copolymers with reactive groups are copolymers of unsaturated organosilicon compounds of the formula

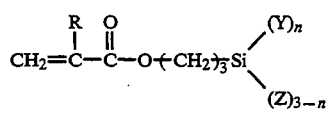

or

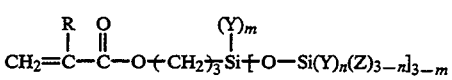
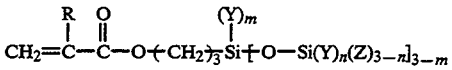

in which n is 0–3, m is 0–3, R is hydrogen or methyl, Y is $C_1$–$C_8$alkyl or phenyl and Z is $C_1$–$C_8$alkoxy or —OCH$_2$CH$_2$OCH$_3$ (component 1), $C_1$–$C_{12}$alkyl(meth)acrylates (component 2), and $C_2$–$C_6$hydroxyalkyl(meth)acrylates or glycidyl(meth)acrylate (component 3).

$C_1$–$C_8$Alkylyl Y can be straight-chain or branched and is, for example, methyl, ethyl, propyl, i-propyl, n-butyl, s-butyl, i-butyl, t-butyl, n-pentyl, i-pentyl, hexyl, heptyl, octyl or 2-ethylhexyl, especially methyl.

$C_1$–$C_8$Alkoxy Z can carry straight-chain or branched alkyl on the O atom and is, for example, methoxy, ethoxy, propoxy, butoxy, t-butoxy, pentoxy, hexoxy, heptoxy, octoxy and especially methoxy and butoxy.

Examples of such compounds of component (1) are:
1-[dimethyl-(3-acryloyloxypropyl)]-3-trimethyldisiloxane,
1-[dimethyl-(3-methacryloyloxypropyl)]-3-trimethyldisiloxane,
3-methacryloyloxypropyl-3-trimethoxysilane and
3-methacryloyloxypropyl-tris(trimethylsiloxy)silane.

Further examples of silicon-containing copolymers are described in U.S. Pat. No. 4,772,672.

The alkyl(meth)acrylates used as component (2) preferably have an alkyl radical with 1–12 and especially 1–8 carbon atoms. Examples of these are methyl, ethyl, propyl, butyl, hexyl, octyl, 2-ethylhexyl, decyl or dodecyl acrylate or methacrylate.

The hydroxyalkyl(meth)acrylates used as component (3) preferably have a hydroxyalkyl radical with 2–6 carbon atoms. Examples of these are 2-hydroxyethyl, 3-hydroxypropyl, 4-hydroxybutyl or 6-hydroxyhexyl acrylate or methacrylate.

Preferred examples of the epoxyalkyl(meth)acrylates used for component (3) are, as already mentioned above, glycidyl acrylate and glycidyl methacrylate.

The further copolymerisable compounds (component 4) used can, for example, be N-hydroxyalkyl(meth)acrylamides, vinyl derivatives, acrylonitrile, unsaturated carboxylic acids or esters thereof; styrene, α-methylstyrene, acrylic acid, methacrylic acid or esters of maleic acid are preferred.

As a further copolymerisable compound (4), the copolymer can also comprise a copolymerisable, sterically hindered amine. Examples of sterically hindered amines suitable for this purpose are 2,2,6,6-tetramethyl-4-piperidyl acrylate or methacrylate and 1,2,2,6,6-pentamethyl-4-piperidyl acrylate or methacrylate.

Preferably, the silicon-containing copolymer consists of 5–40% by weight of component (1), 30–70% by weight of component (2), 5–20% by weight of component (3) and 0–30% by weight of component (4).

Copolymers of an ethylenically unsaturated organosilicon compound, acrylic or methacrylic acid, styrene and at least one alkyl(meth)acrylate, which can also comprise a hydroxyalkyl(meth)acrylate, are preferred.

An example of the preparation of the silicon-containing copolymer according to the invention is schematically represented below: By reacting an unsaturated silicon compound with a vinylcarboxylate and an unsaturated carboxylic acid, a silicon-containing copolymer is obtained:

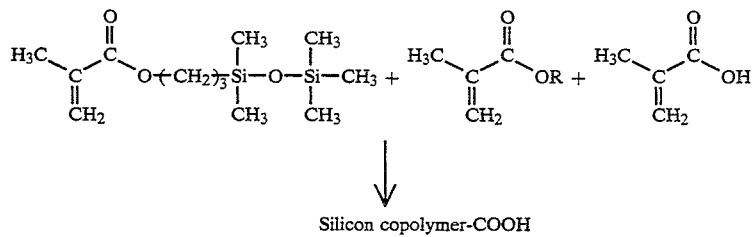

R is an organic radical.

The reaction of this polymer with a UV absorber which, as reactive group, comprises an epoxide radical, then gives the copolymer comprising a UV absorber:

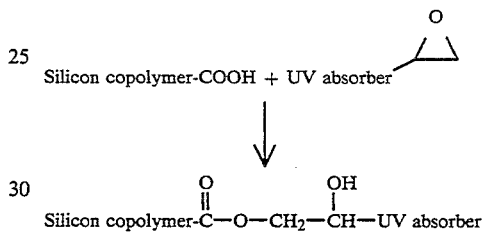

It is also possible that the silicon copolymer comprises the reactive epoxide end group and the UV absorber comprises an —OH or —COOH functional group. The scheme then looks as follows, for example:

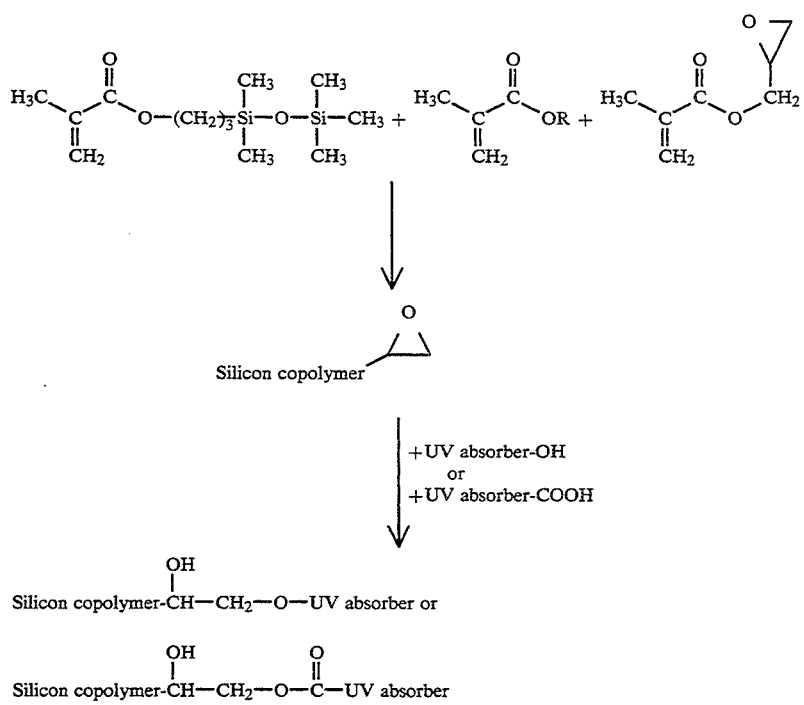

The reactive groups of the copolymer can also be prepared by reacting a copolymer with an appropriate reagent. For example, a copolymer comprising hydroxyl groups can be reacted with a dicarboxylic acid anhydride to give a copolymer which comprises carboxyl groups.

In this respect, reaction products of a copolymer of chlorotrifluoroethylene, hydroxybutyl vinyl ether and at least one alkyl vinyl ether or cycloalkyl vinyl ether with a dicarboxylic acid anhydride, for example with succinic anhydride, maleic anhydride or phthalic anhydride, the reaction product comprising free carboxyl groups, are of particular importance.

In addition to the fluorine or silicon compound and the reactive comonomers, the copolymers can also comprise unreactive comonomers such as, for example, alkyl acrylates or methacrylates, styrene, acrylonitrile, alkyl vinyl ethers or acrylamide.

The reactive UV absorbers can comprise, for example, a hydroxyl group, carboxyl group or epoxide group as the reactive group. Preferably, the reactive UV absorber comprises a glycidyl group.

Examples of reactive UV absorbers which can be used according to the invention are the following compounds:

1) 2-(2-Hydroxyphenyl)-benzotriazoles

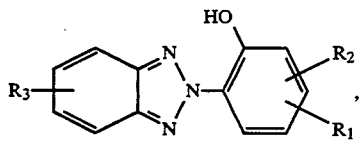

in which $R_1$–$R_3$ are

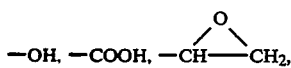

hydrogen, $C_1$–$C_{18}$alkyl, $C_1$–$C_{18}$alkoxy, $C_2$–$C_{18}$alkyoxycarbonyl, $C_7$–$C_9$aralkyl or a sulfonic acid group and the groups

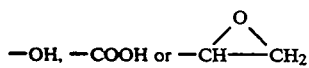

can be bound directly or via a bridge member to the aromatic ring, with the proviso that at least one of the radicals $R_1$–$R_3$ is the group

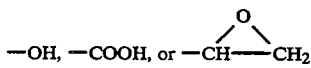

or comprises such a group.

$C_1$–$C_{18}$Alkyl $R_1$, $R_2$ or $R_3$ can be straight-chain or branched alkyl and, for example, can be methyl, ethyl, n-propyl, i-propyl, n-butyl, t-butyl, pentyl, hexyl, heptyl, octyl, 2-ethylhexyl, decyl, dodecyl or octadecyl.

In $C_1$–$C_{18}$alkoxy $R_1$, $R_2$ or $R_3$, the alkyl radical on the O atom can be straight-chain or branched and can be, for example, methoxy, ethoxy, n-propoxy, i-propoxy, n-butoxy, t-butoxy, pentoxy, hexoxy, heptoxy, octoxy, 2-ethylhexoxy, decyloxy, dodecyloxy or octadecyloxy.

$C_2$–$C_{18}$alkoxycarbonyl $R_1$, $R_2$ or $R_3$ can assume, for example, the definitions given for alkoxy, starting from ethoxy, appending the term carbonyl.

$C_7$–$C_9$Aralkyl $R_1$, $R_2$ or $R_3$ are, for example, benzyl, phenylethyl, phenylpropyl or α-methylbenzyl.

Examples of bridge members are —O—, —(CH$_2$)$_n$—COO—, —(CH$_2$)$_n$—COO—(CH$_2$)$_n$—O— or —OOC—(CH$_2$)$_n$—O—, n being a number from 1 to 4.

Examples of 2-(2-hydroxyphenyl)benzotriazoles having reactive groups are compounds of the formula

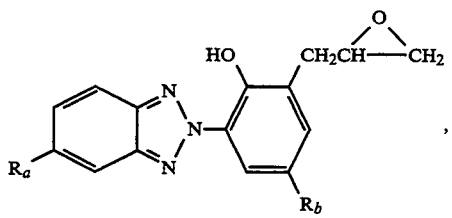

in which $R_a$ is hydrogen, Cl, —CH$_3$ or —OCH$_3$ and $R_b$ is —CH$_3$, —C(CH$_3$)$_3$ or —C(CH$_3$)$_2$—CH$_2$—C(CH$_3$)$_3$.

Other examples are compounds of the formula

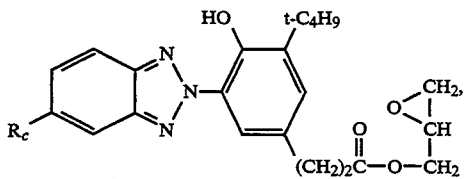

in which $R_c$ is hydrogen or chlorine.

Further examples are the compounds

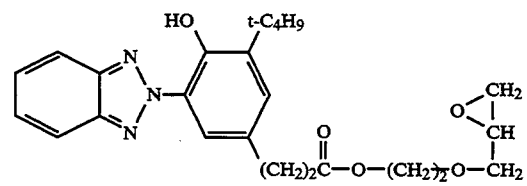

and

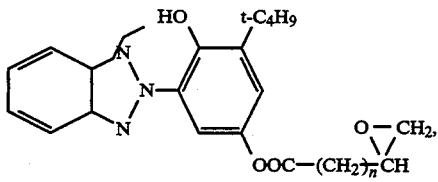

in which n is a number of 1–4, and

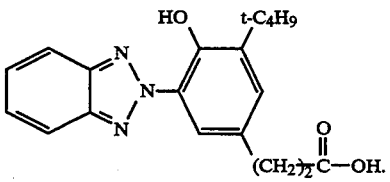

2) 2-(2-Hydroxyphenyl)triazines

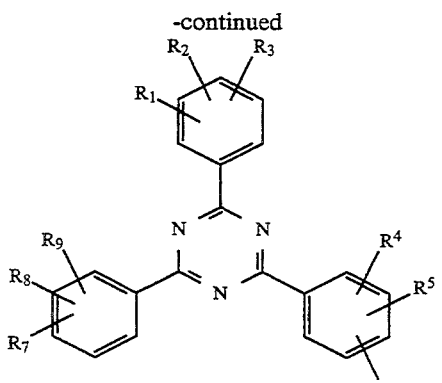

in which R₁–R₉ are

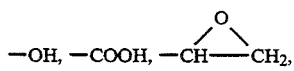

hydrogen, $C_1$–$C_{18}$alkyl, $C_1$–$C_{18}$alkoxy, $C_2$–$C_{18}$alkoxycarbonyl, $C_7$–$C_9$aralkyl or a sulfonic acid group and the groups

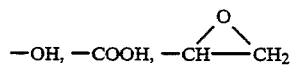

can be bound directly or via a bridge member to the aromatic ring, with the proviso that at least one of the radicals R₁–R₉ is a group

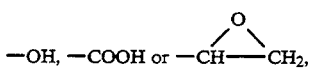

or comprises such a group, and that at least one of the radicals R₁–R₉ is an o-hydroxy group which does not represent the reactive group.

$C_1$–$C_{18}$Alkyl, $C_1$–$C_{18}$alkoxy, $C_2$–$C_{18}$alkoxycarbonyl or $C_7$–$C_9$aralkyl R₁–R₉ can assume the same definitions as those listed under the benzotriazoles for the radicals R₁–R₃.

Examples of the definitions of the bridge members are listed under the benzotriazoles.

Examples of hydroxyphenyltriazines are:

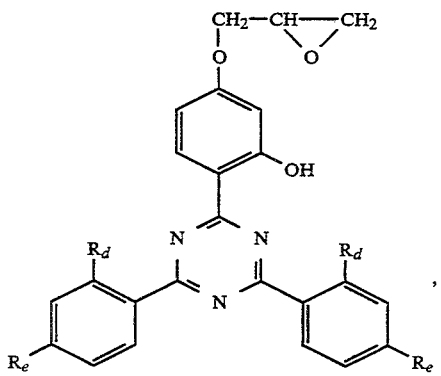

where $R_d$=H and $R_e$=H, or $R_d$=H and $R_e$=—CH₃, or $R_d$=—CH₃ and $R_e$=—CH₃.

A further example is the compound of the formula

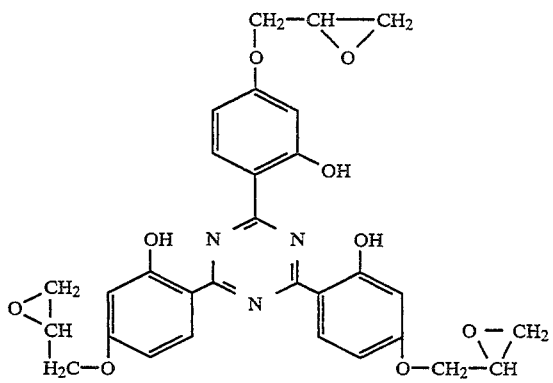

Other examples are compounds of the formulae

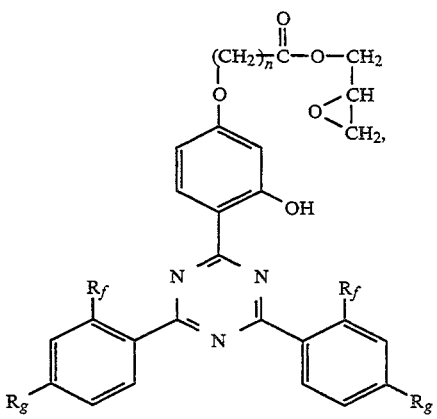

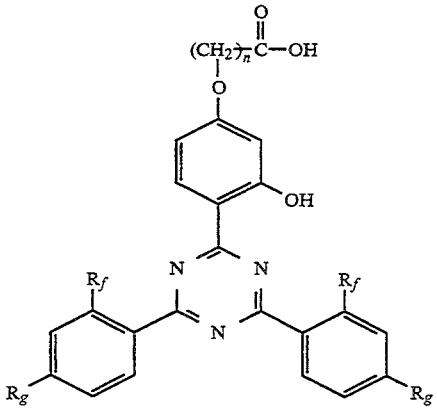

and

-continued

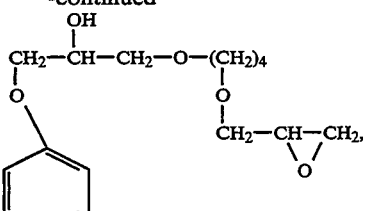

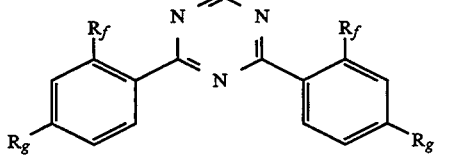

where $R_f = H$ and $R_g = H$ or $R_f = H$ and $R_g = -CH_3$ or $R_f = -CH_3$ and $R_g = CH_3$, and also

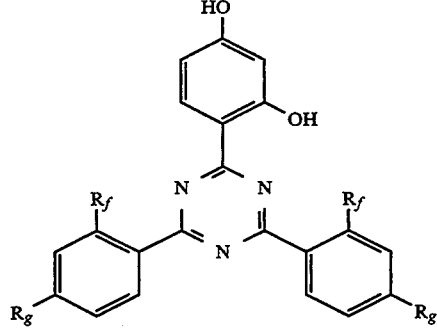

3) o-Hydroxybenzophenones

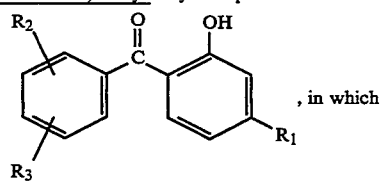, in which $R_1$–$R_3$ are

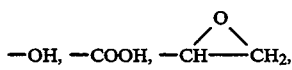

hydrogen, $C_1$–$C_{18}$alkyl, $C_1$–$C_{18}$alkyoxy, $C_2$–$C_{18}$alkoxycarbonyl, $C_7$–$C_9$aralkyl or a sulfonic acid group and the groups

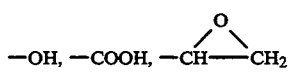

can be bound directly or via a bridge member to the aromatic ring, with the proviso that at least one of the radicals $R_1$–$R_3$ is a group

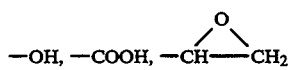

or comprises such a group.

$C_1$–$C_{18}$Alkyl, $C_1$–$C_{18}$alkoxy, $C_2$–$C_{18}$alkoxycarbonyl or $C_7$–$C_9$aralkyl $R_1$–$R_3$ can assume the same definitions as those listed under the benzotriazoles for the radicals $R_1$–$R_3$.

Examples of the definitions of the bridge members are listed under the benzotriazoles.

Benzophenones are preferred in which $R_2$ and $R_3$ simultaneously or independently of one another are hydrogen, $C_1$–$C_{12}$alkyl or $C_1$–$C_{12}$alkoxy and $R_1$ is a group —O—A, in which A is hydrogen or a radical

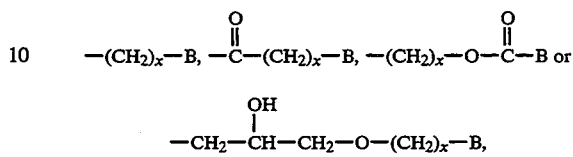

in which x is a number of 1–12 and B is

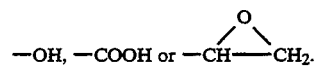

Examples of benzophenones having reactive groups are the compounds

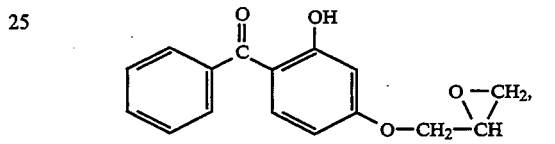

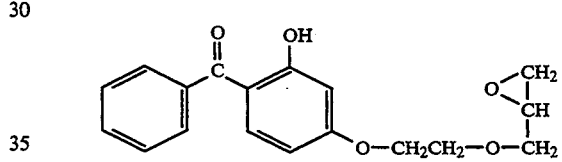

and

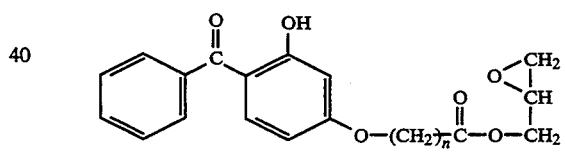

and

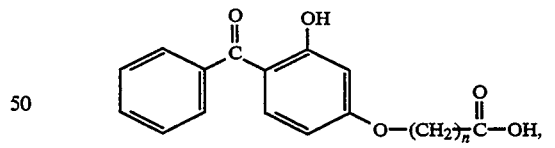

in which n is 1–4, and also

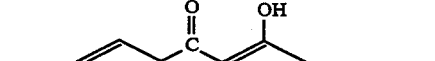

4) Oxanilides

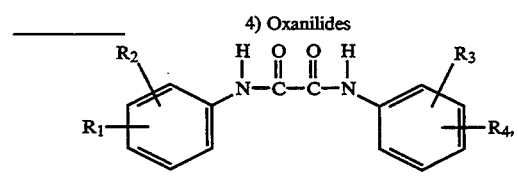

in which $R_1$–$R_4$ are

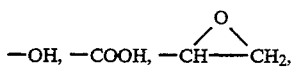

hydrogen, $C_1$-$C_{18}$alkyl, $C_1$-$C_{18}$alkoxy, $C_2$-$C_{18}$alkoxycarbonyl, $C_7$-$C_9$aralkyl or a sulfonic acid group and the groups

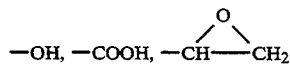

can be bound directly or via a bridge member to the aromatic ring, with the proviso that at least one of the radicals $R_1$-$R_4$ is a group

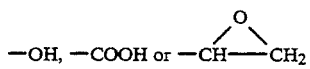

or comprises such a group.

$C_1$-$C_{18}$Alkyl, $C_1$-$C_{18}$alkoxy, $C_2$-$C_{18}$alkoxycarbonyl or $C_7$-$C_9$aralkyl $R_1$-$R_4$ can assume the same definitions as those listed under the benzotriazoles for the radicals $R_1$-$R_3$.

Examples of bridge members are listed under the benzotriazoles.

Oxanilides of the formula

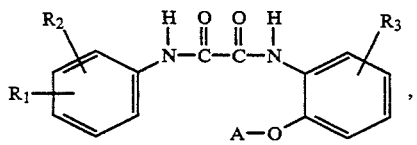

in which $R_1$-$R_3$ simultaneously or independently of one another are hydrogen, $C_1$-$C_{18}$alkyl, $C_1$-$C_{18}$alkoxy or $C_2$-$C_{18}$alkoxycarbonyl and A is hydrogen or a radical

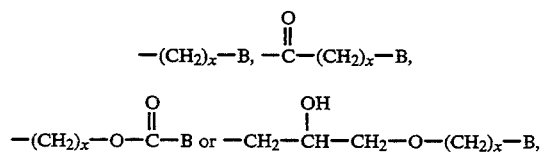

in which x is a number of 1-12 and B is —OH,

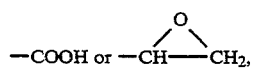

are preferred.

Examples of oxanilides having reactive groups are the compounds

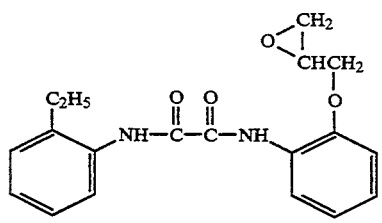

and

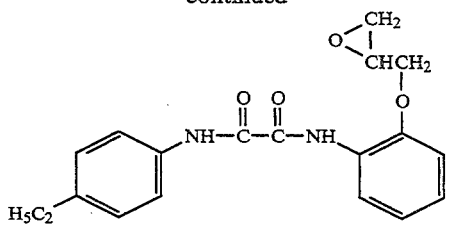

The preferred UV absorbers are benzotriazoles and triazines, especially benzotriazoles.

The preparation of the classes of UV absorber compounds listed above is known to those skilled in the art.

The reaction of the copolymers (a) with the reactive UV absorbers is preferably carried out in solution. Suitable solvents are inert non-polar or polar solvents, for example toluene, xylene, dioxane, tetrahydrofuran, methyl ethyl ketone, cyclohexanone, butyl acetate, trichloroethylene or dimethylformamide. With advantage, solvent mixtures are used.

If the preparation of the copolymer is carried out in solution, the resulting solution of the copolymer can be used for the reaction with the UV absorber, without isolation of the copolymer.

The reaction can be accelerated by heating and by the addition of catalysts. The catalysts used are those which are also known for corresponding reactions with non-polymeric compounds. For example, acid catalysts can be used for esterifications, alkali metal alcoholates for transesterifications and tertiary amines for reactions of epoxides with hydroxyl groups.

For isolation of the end product, the solution can be evaporated, or the end product is precipitated by addition of a non-solvent.

If a copolymer (a) is used which does not yet contain a 2,2,6,6-tetramethylpiperidine derivative in a copolymerised form, a further embodiment of the process comprises also reacting the copolymer with a reactive 2,2,6,6-tetramethylpiperidine derivative in addition to the reactive UV absorber. The simultaneous presence of such a sterically hindered amine and of a UV absorber frequently leads to a synergistic stabilising action.

The tetramethylpiperidine derivatives have the same reactive groups as the UV absorbers, i.e. for example hydroxyl, carboxyl or epoxide groups.

Examples of 2,2,6,6-tetramethylpiperidine derivatives having reactive groups are the compounds

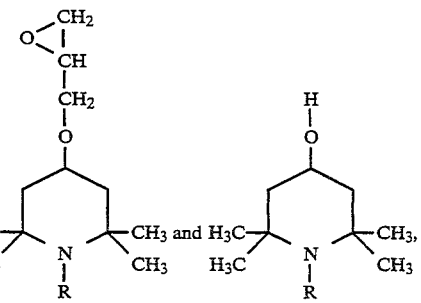

in which R is hydrogen, $C_1$-$C_4$alkyl, —CH$_2$—CH=CH$_2$, benzyl,

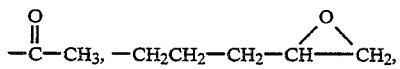

-continued

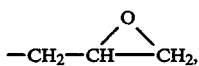

$C_1$-$C_{12}$alkoxy or $C_5$-$C_6$cycloalkoxy.

$C_1$-$C_4$Alkyl R can be straight-chain or branched and is, for example, methyl, ethyl, n-propyl, i-propyl, n-butyl or t-butyl.

$C_1$-$C_{12}$Alkoxy R is, for example, methoxy, ethoxy, propoxy, butoxy, pentoxy, hexoxy, octoxy, decyloxy or dodecyloxy.

$C_5$-$C_6$Cycloalkoxy R is cyclopentoxy or cyclohexoxy.

Other examples of such compounds are

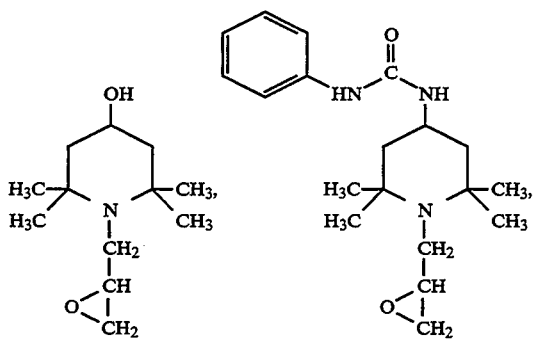

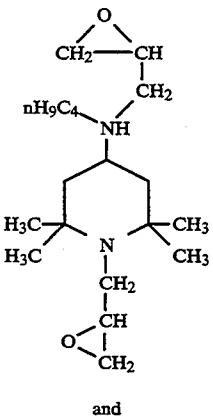

and

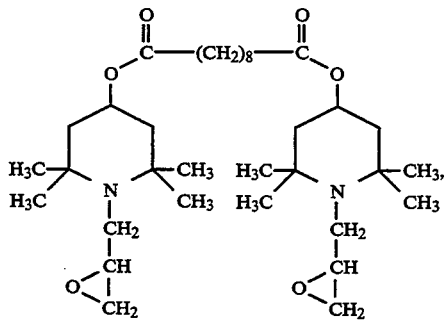

The reaction of the copolymer with the tetramethylpiperidine derivative can take place simultaneously with the reaction with the reactive UV absorber, or the two reactions are carried out successively.

The quantity of the reactive UV absorber is preferably such that the modified copolymer comprises 0.05 to 20% by weight, preferably 0.05 to 10 and especially 0.05 to 5% by weight, of UV absorber. If a modification with a piperidine derivative is also carried out, the modified copolymer should preferably comprise 0.05 to 5% by weight of piperidine derivative.

Component (b) is a (meth)acrylic copolymer such as is conventionally used as a paint binder. These copolymers are also called acrylic resins. They consist in the main of one or more alkyl acrylates or methacrylates and comprise a smaller quantity of a functional acrylate or methacrylate. The (meth)acrylic copolymer accordingly comprises functional groups which can react with a suitable curing agent to effect crosslinking.

A large selection of such acrylic resins are commercially available. Preferably, an acrylic resin is used which is a copolymer of several alkyl acrylates or methacrylates, a hydroxyalkyl(meth)acrylate and acrylic or methacrylic acid.

Component (c) is a curing agent which can react with the functional groups of components (a) and (b). Preferably, a melamine resin or a polyisocyanate or a mixture of the two is used for this purpose.

The melamine resins suitable as curing agents are especially N-hydroxymethyl and N-alkoxymethyl derivatives of melamine. Such melamine derivatives suitable as curing agents are commercially available and are conventionally used for curing acrylic resins.

Polyisocyanates suitable as curing agents are especially diisocyanates and triisocyanates, for example toluene diisocyanate, diphenylmethane 4,4'-diisocyanate, hexamethylene diisocyanate or isophorone diisocyanate, and dimerised, trimerised or masked derivatives of these.

The (a):(b) ratio can be varied within a wide range. Preferably, the (a):(b) weight ratio is 20:80 to 80:20. The quantity of curing agent (c) depends on the quantity of functional groups in (a) and (b). Preferably, 3 to 80 parts by weight of curing agent are used per 100 parts of the total of (a) and (b). In a preferred embodiment, the mixture according to the invention consists of 30–50% by weight of (a), 30–50% by weight of (b) and 10–25% by weight of (c).

The compositions according to the invention can be used as binders for weather-resistant paints. In the simplest case, the paints comprise a composition according to the invention and a solvent. The paints can be clearcoats or pigmented coatings. The pigments used can be inorganic, organic or metallic pigments. The viscosity of the paints can be regulated by the addition of solvents or thickeners. The paints can contain further additives, for example fillers, plasticisers, levelling agents, adhesion promoters, curing accelerators, antioxidants or light stabilisers. The addition of light stabilisers from the class of the sterically hindered amines is of particular importance, since these can, with the incorporated UV absorber of the binder, effect a synergistic increase in the weathering resistance. Examples of sterically hindered amines are especially derivatives of 2,2,6,6-tetramethylpiperidine, as described, for example, in Kunststoffe 77 (1987) 1065–69, in EP-A-15 652 on pages 5–17, or in EP-A-293 871.

Depending on the curing agent used, these paints can be cured at room temperature or at elevated temperature. In every case, curing is accelerated by heating (baking). An acceleration can also be effected by adding curing catalysts. Thus, for example, the curing with isocyanates can be accelerated by organotin compounds or by basic catalysts (for example tertiary amines). The curing with melamine resins can be accelerated by acid catalysts, for example by adding toluenesulfonic acid.

The cured paints are distinguished not only by high weathering resistance, but also by a high gloss. The substrates can be the usual bases, such as metal, wood, ceramic materials or plastics. In multi-layer coatings, the paints with the coating materials modified according to the invention are preferably used as topcoat, since they represent a screen for the irradiation with UV light. The cured paint films are also a subject of the invention.

The examples which follow explain the invention in more detail. Data given in parts and percentages in the examples, and also in the remaining description and in the patent claims, relate to the weight, unless otherwise stated. In paints, the percentage data relate to the weight of the solid paint constituents, unless otherwise stated.

EXAMPLE 1

Preparation of a fluorine-containing resin without light stabiliser

In a 1 liter autoclave with a stirrer, 75 g of cyclohexyl vinyl ether, 43 g of ethyl vinyl ether and 35 g of hydroxybutyl vinyl ether are dissolved under nitrogen in 340 ml of xylene, and 6 g of potassium carbonate as well as 0.3 g of azoisobutyronitrile are added. 150 g of chlorotrifluoroethylene are added to this mixture, and the autoclave is sealed and heated to 65° C. with stirring. This temperature is held for 7 hours, and the autoclave is then cooled to room temperature. After the resulting suspension has been filtered off, 25 g of succinic anhydride are added to the filtrate, and the solution is heated to 110° C. This temperature is held for 2 hours, and the solution is then cooled to room temperature. This gives a 50% polymer solution which contains 0.25 mol of carboxyl groups.

EXAMPLE 2

Preparation of a fluorine-containing resin+benzotriazole (UV-1)

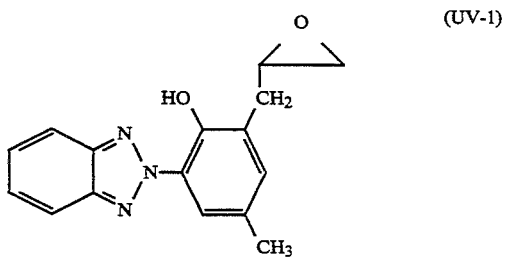

In a 2 liter glass flask, 600 g of the polymer solution from Example 1 are mixed with 15 g of the compound UV-1, and the mixture is heated for 48 hours under reflux (internal temperature about 110° C.). During this time, the epoxide groups of the compound UV-1 react with the carboxyl groups of the fluorine-containing resin. According to elemental analysis, the polymer contains 5% of the benzotriazole compound.

EXAMPLE 3

Preparation of a fluorine-containing resin+benzotriazole+Hindered Amine Light Stabiliser (HALS-1)

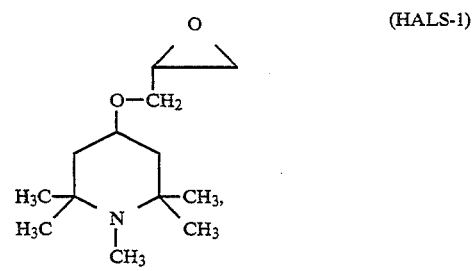

In a 2 liter glass flask, 600 g of the polymer solution from Example 1 are mixed with 15 g of the compound UV-1 and 7.5 g of the compound HALS-1, and the mixture is heated under reflux for 48 hours. During this time, the epoxide groups of the compounds UV-1 and HALS-1 react with the carboxyl groups of the fluorine-containing resin. According to elemental analysis, the polymer contains 5% of the benzotriazole compound and 2.5% of the HALS compound.

EXAMPLE 4

Preparation of a silicon-containing resin without light stabiliser

A mixture of 270 g of xylene and 30 g of 4-methyl-2-pentanone is heated to 105° C. At this temperature, a mixture of 30 g of 3-methacryloyloxypropyl-pentamethyl-disiloxane, 51 g of styrene, 22 g of methyl methacrylate, 140 g of 2-ethylhexyl methacrylate, 48 g of 2-hydroxyethyl methacrylate, 20 g of methacrylic acid and 2.1 g of azoisobutyronitrile is added dropwise in the course of 4 hours. The mixture is then stirred for 2 hours at this temperature. This gives an about 50% solution of the copolymer, which contains 0.24 mol of carboxyl groups.

EXAMPLE 5

Preparation of a silicon-containing resin+benzotriazole (UV-1)

In a 2 liter glass flask, 600 g of the polymer solution described in Example 4 are mixed with 15 g of the compound UV-1 and heated under reflux for 48 hours. During this time, the epoxide groups of the compound UV-1 react with the carboxyl groups of the silicon-containing resin. According to elemental analysis, the polymer contains 5% of the benzotriazole compound.

EXAMPLE 6

Preparation of a silicon-containing resin+triazine (UV-2)

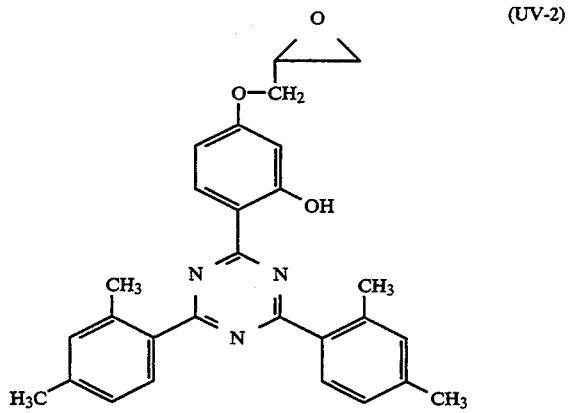

The preparation is carried out analogously to the method described in Example 5, but with 15 g of the compound UV-2 being used as light stabiliser in place of the compound UV-1.

According to elemental analysis, the resulting polymer contains 5% of the triazine compound.

EXAMPLE 7

Preparation of a silicon-containing resin+benzophenone (UV-3)

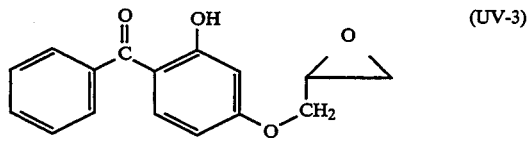

The preparation is carried out analogously to the method described in Example 5, but with 15 g of the compound UV-3 being used as light stabiliser in place of the compound UV-1. According to elemental analysis, the resulting polymer contains 5% of the benzophenone compound.

EXAMPLE 8

Preparation of a silicon-containing resin+benzotriazole (UV-4)

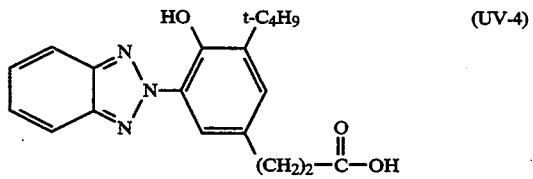

A mixture of 12.1 g of methyl methacrylate, 24.2 g of butyl methacrylate, 25.2 g of glycidyl methacrylate and 6.8 g of 3-methacryloyloxypropyl-pentamethyldisiloxane and simultaneously a solution of 1.2 g of azoisobutyronitrile in 20 ml of toluene are added dropwise with stirring in the course of 3 hours at 105° C. under nitrogen to 55 ml of dry toluene. The clear solution is then heated for 1 hour under reflux. 33 g of the compound UV-4 are then introduced at 100° C. into the copolymer solution. After refluxing for 24 hours, a clear solution is obtained from the initial suspension. The solids content is 35%. The clearcoat contains 33% of UV-4, relative to the solids.

EXAMPLE 9

Preparation of a silicon-containing resin+triazine (UV-5)

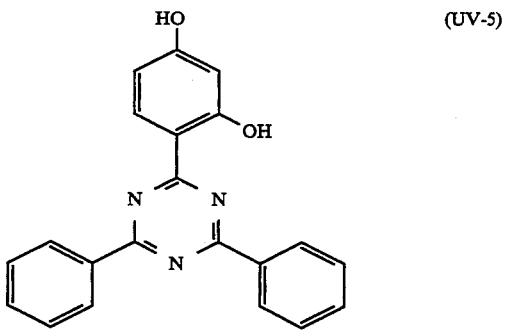

A mixture of 3.7 g of methyl methacrylate, 7.4 g of butyl methacrylate, 7.6 g of glycidyl methacrylate and 2.1 g of 3-methacryloyloxypropyl-pentamethyldisiloxane and simultaneously a solution of 0.4 g of azoisobutyronitrile in 6 ml of toluene are added dropwise with stirring in the course of 3 hours at 105° C. under nitrogen to 16.7 ml of dry toluene. The clear solution is then heated for 1 hour under reflux. At 100° C., 10 g of the compound UV-5 are then introduced into the copolymer solution. After refluxing for 24 hours, a clear solution is obtained from the initial suspension. The solids content is 14%. The clearcoat contains 33% of UV-5, relative to the solids.

APPLICATION EXAMPLES

EXAMPLE 10

A mixture is prepared from (a) 19.5 parts of a copolymer prepared as in Example 2 and containing a light stabiliser and fluorine, (b) 19.5 parts of an acrylate resin (copolymer of 31% of ethyl acrylate, 29.5% of methyl methacrylate, 20.2% of 2-ethylhexyl methacrylate, 16.2% of 2-hydroxyethyl methacrylate and 3.1% of methacrylic acid) and (c) 9.8 parts of a melamine resin (Cymel ® 1130, Cyanamid Corp.) as crosslinking agent. 0.2% of p-toluenesulfonic acid is added as catalyst to the mixture. The composition according to the invention contains 2% of UV-1 (incorporated). A mixture which, as component (a), contains 19.5 parts of the fluorine-containing copolymer prepared in Example 1 (without UV absorber) is used as a comparison.

The clearcoat mixture is adjusted with xylene to sprayability, applied to an aluminium sheet coated with a silver-metallic basecoat, flashed off for about 15 minutes at room temperature and then baked for 30 minutes at 130° C. This gives a dry film thickness of about 45 μm. The test sheet is tested by accelerated weathering (UVCON®, Atlas Corp.; UVB 313 lamps, cycle 8 hours UV, 4 hours condensation at 50° C.). Before the start and after 2000 hours of weathering, the 60° gloss is determined according to DIN 67 530. As the result of the weathering test, Table 1 gives the gloss retention after 2000 hours (gloss retention after 0 hours of weathering = 100%).

TABLE 1

Gloss retention of the clearcoat after 2000 hours of weathering (60° gloss according to DIN 67 530)

| Component (a) from | Gloss retention after 2000 hours |
|---|---|
| Example 1 (unstabilised) | 24% |
| Example 2 (containing UV-1) | 75% |

The sample containing light stabiliser gives good gloss retention and absence of cracks.

EXAMPLE 11

According to the method described in Example 10, a clearcoat is prepared and applied which, in place of the fluorine-containing copolymer from Examples 1 and 2, contains the silicon-containing copolymer from Examples 4–6. The coating prepared from the copolymer of Example 5 contains 2% of UV-1 (incorporated), and that from the copolymer of Example 6 contains 2% of UV-2 (incorporated). The coating samples are weathered as in Example 10. Before the start and after 800 hours of weathering, the 60° gloss is determined according to DIN 67 530. As the result of the weathering test, Table 2 gives the gloss retention after 800 hours (gloss retention after 0 hours of weathering=100%).

TABLE 2

Gloss retention of the clearcoat after 800 hours of weathering (60° gloss according to DIN 67 530)

| Component (a) from | Gloss retention after 800 hours |
|---|---|
| Example 4 (unstabilised) | 32% |
| Example 5 (containing UV-1) | 40% |
| Example 6 (containing UV-2) | 53% |

EXAMPLE 12

A mixture is prepared from (a) 19.5 parts of one of the fluorine-containing copolymers prepared in Examples 1–3, (b) 19.5 parts of an acrylate resin (copolymer of 31% of ethyl acrylate, 29.5% of methyl methacrylate, 20.2% of 2-ethylhexyl methacrylate, 16.2% of 2-hydroxyethyl methacrylate and 3.1% of methacrylic acid) and (c) 5.25 parts of an isocyanate (Desmodur® N75, Bayer AG) as crosslinking agent. The application and testing for gloss retention are carried out as described in Example 10, baking being carried out for 45 minutes at 80° C. and the gloss retention being measured after 2200 hours of weathering. The dry film thickness of the coating is about 45 μm. The coating prepared from the copolymer of Example 2 contains 2.2% of UV-1 (incorporated), and that from the copolymer of Example 3 contains 2.2% of UV-1 (incorporated) and 1.1% of HALS-1 (incorporated).

As the result of the weathering test, Table 3 gives the gloss retention after 2200 hours (gloss retention after 0 hours weathering=100%).

TABLE 3

Gloss retention of the clearcoat after 2200 hours of weathering (60° gloss according to DIN 67 530).

| Component (a) from | Gloss retention after 2200 hours |
|---|---|
| Example 1 (unstabilised) | 19% |
| Example 2 (containing UV-1) | 45% |
| Example 3 (containing UV-1 and HALS-1) | 50% |

The samples containing light stabiliser show good gloss retention and absence of cracks.

EXAMPLE 13

Example 12 is repeated, the fluorine-containing copolymers from Examples 1–3 being replaced by the silicon-containing copolymers from Examples 4–7. The coating prepared from the copolymer of Example 5 contains 2.2% of UV-1 (incorporated), that from the copolymer of Example 6 contains 2.2% of UV-2 (incorporated), and that from the copolymer from Example 7 contains 2.2% of UV-3 (incorporated). Additionally, 1% of bis(1,2,2,6,6-pentamethyl-4-piperidyl) sebacate (HALS-2; quantity relative to the solids content) is added to a clearcoat based on the copolymer of Example 5.

As the result of the weathering test, Table 4 gives the gloss retention after 2000 hours (gloss retention after 0 hours of weathering=100%).

TABLE 4

Gloss retention of the clearcoat after 2000 hours of weathering (60° gloss according to DIN 67 530)

| Component (a) from | Gloss retention after 2000 hours |
|---|---|
| Example 4 (unstabilised) | 15% |
| Example 5 (containing UV-1) | 90% |
| Example 6 (containing UV-2) | 100% |
| Example 7 (containing UV-3) | 62% |
| Example 5 (containing UV-1) + HALS-2* | 100% |

*HALS-2 = bis(1,2,2,6,6-pentamethyl-4-piperidyl) sebacate

The samples containing light stabiliser show good gloss retention and absence of cracks.

What is claimed is:

1. A curable composition comprising
   (a) fluorine- or silicon-containing copolymer,
   (b) a (meth)acrylic copolymer, and
   (c) a curing agent,
   each of the two copolymers comprising functional groups which can react with the curing agent, and wherein the fluorine- or silicon-containing copolymer (a) comprises a UV absorber, which is a derivative of a 2-(2-hydroxyphenyl)-benzotriazole, a 2-(2-hydroxyphenyl)-1,3,5-triazine or an o-hydroxybenzophenone, and which is chemically bound by reaction with the free reactive groups of the finished copolymer.

2. A composition according to claim 1, wherein the copolymers (a) and (b) comprise hydroxyl groups, and the curing agent is a compound which can react with the hydroxyl groups.

3. A composition according to claim 1, wherein the copolymer comprises carboxyl groups and the reactive UV absorber comprises an epoxide group.

4. A composition according to claim 1, wherein the component (a) is a copolymer of
   (1) a polyfluoroolefin,
   (2) an alkyl vinyl ether, a cycloalkyl vinyl ether or a mixture thereof, and
   (3) a hydroxyalkyl vinyl ether.

5. A composition according to claim 4, wherein the copolymer is a reaction product of a copolymer of chlorotrifluoroethylene, hydroxybutyl vinyl ether and an alkyl vinyl ether or cycloalkyl vinyl ether with a dicarboxylic acid anhydride containing free carboxyl groups.

6. A composition according to claim 1, wherein the component (a) is a copolymer of
   (1) an ethylenically unsaturated organosilicon compound,
   (2) an alkyl acrylate or methacrylate, and (3) a hydroxyalkyl(meth)acrylate, an epoxyalkyl(-meth)acrylate or mixture thereof.

7. A composition according to claim 6, wherein the component (1) is a compound of the formula

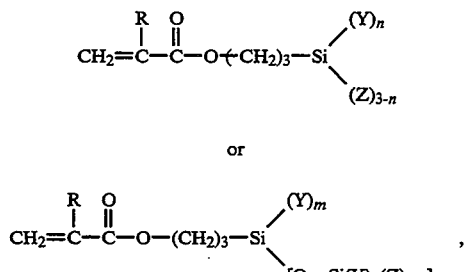

in which n is 0–3, m is 0–3, R is hydrogen or $CH_3$, Y is $C_1$–$C_8$alkyl or phenyl and Z is $C_1$–$C_8$alkoxy or $-OCH_2CH_2OCH_3$, and a $C_1$–$C_{12}$alkyl(meth)acrylate is used as component (2), and a $C_2C_6$hydroxyalkyl(meth)acrylate or glycidyl(meth)acrylate is used as component (3).

8. A composition according to claim 1, wherein the component (b) is a copolymer of a plurality of alkyl acrylates or methacrylates, a hydroxyalkyl(meth)acrylate and acrylic acid or methacrylic acid.

9. A composition according to claim 1, wherein the component (c) is a melamine resin, a polyisocyanate or mixture thereof.

10. A composition according to claim 1, wherein the weight ratio of (a) to (b) is 20:80 to 80:20 and the weight ratio of (c) to the total sum of (a) and (b) is 3–80 to 100.

11. A composition according to claim 1, wherein the copolymer (a) comprises a copolymerised, sterically hindered amine.

12. A composition according to claim 1, wherein the finished copolymer (a) has also been reacted with a reactive 2,2,6,6-tetramethylpiperidine derivative in addition to the reactive UV absorber.

13. A clearcoat or pigmented coating, which comprises a composition according to claim 1 as binder.

14. A clearcoat or pigmented coating according to claim 13, which comprises a light stabiliser from the class of the sterically hindered amines.

15. A cured paint film, obtained by curing a coating according to claim 13.

16. A process for preparing a curable composition, which comprises
  reacting a fluorine- or silicon-containing copolymer comprising free functional groups with a UV absorber, which is a derivative of a 2-(2-hydroxyphenyl)-benzotriazole, a 2-(2-hydroxyphenyl)-1,3,5-triazine or an o-hydroxybenzophenone, and which contains reactive groups which can react with the functional groups of the copolymer, and
  mixing the product with a (meth)acrylic copolymer, which likewise comprises functional groups, and a curing agent.

17. A process according to claim 16, wherein the curable composition is a binder for clearcoats or pigmented coatings.

* * * * *